(12) United States Patent
Ogata

(10) Patent No.: US 7,635,146 B2
(45) Date of Patent: Dec. 22, 2009

(54) OCCUPANT RESTRAINT SYSTEM

(75) Inventor: Yoshihisa Ogata, Chiryu (JP)

(73) Assignee: Denso Corporation, Kariya (JP)

( * ) Notice: Subject to any disclaimer, the term of this patent is extended or adjusted under 35 U.S.C. 154(b) by 425 days.

(21) Appl. No.: 11/591,416

(22) Filed: Oct. 26, 2006

(65) Prior Publication Data

US 2007/0114769 A1    May 24, 2007

(30) Foreign Application Priority Data

Nov. 18, 2005    (JP) ............................. 2005-334505

(51) Int. Cl.
*B60R 21/01* (2006.01)
(52) U.S. Cl. ..................... 280/735; 180/282; 701/45; 280/730.2
(58) Field of Classification Search ............... 280/735, 280/730.2; 701/45; 180/282
See application file for complete search history.

(56) References Cited

U.S. PATENT DOCUMENTS 6,650,981 B2 *  11/2003  Sekizuka et al. .............. 701/45
7,076,353 B2     7/2006  Ogata et al.

FOREIGN PATENT DOCUMENTS

JP    2005-225284    8/2005

\* cited by examiner

*Primary Examiner*—Ruth Ilan
(74) *Attorney, Agent, or Firm*—Harness, Dickey & Pierce, PLC

(57) ABSTRACT

An occupant restraint system includes an occupant restraint device on a side face of an automobile interior, at least one of an acceleration sensor for detecting a lateral acceleration of the automobile and a roll sensor for detecting a roll of the automobile, and a determining unit. A detected signal is input into the determining unit. The determining unit determines a rollover or an overthrow of the automobile based on the detected signals, and calculates a head position of the occupant using the detected signals. Then, the determining unit activates the occupant restraint device, when the rollover is determined to have happened and the calculated head position is determined to be close to the occupant restraint device.

12 Claims, 4 Drawing Sheets

OCCUPANT RESTRAINT SYSTEM

CROSS REFERENCE TO RELATED APPLICATION

This application is based on Japanese Patent Application No. 2005-334505 filed on Nov. 18, 2005, the disclosure of which is incorporated herein by reference in its entirety.

BACKGROUND OF THE INVENTION

1. Field of the Invention

The present invention relates to an occupant restraint system, which protects an occupant in an automobile when the automobile is in a lateral collision.

2. Description of Related Art

An automobile is equipped with an occupant restraint system, which protects an occupant in the automobile when the automobile is in a collision. For example, an airbag is provided in an automobile as the occupant restraint system. The airbag is inflated so as to protect an occupant in the automobile. Further, the occupant restraint system is required not only for a collision in a back-and-forth direction but also for a lateral, i.e., side-to-side, impact. U.S. Pat. No. 7,076,353 (corresponding to JP-A-2004-262410) discloses an occupant restraint system, for example. A curtain airbag protects an occupant from crashing into a sidewall of an automobile interior, and a pretensioner restrains an occupant from being displaced by a lateral impact.

When an automobile receives a lateral impact, the automobile may roll over. The rollover of the automobile has a variety of patterns, and one of the patterns is a trip-over. In the trip-over, after an automobile sideslips, i.e., lateral displacement, the automobile trips over a step, e.g., curbstone, such that the automobile rolls over by an inertial force. Another pattern is a flip-over. In the flip-over, a wheel of an automobile runs on a curbstone, and the automobile rolls over by the impact.

In a conventional occupant restraint system, a rollover of an automobile is determined using signals detected by an acceleration sensor and an angular rate sensor. An airbag is inflated, when the automobile is determined to roll over. Even if the automobile does not roll over as a result by an external factor after the automobile is determined to roll over by the signals, an occupant restraint device, e.g., airbag, is activated. However, the activation of the airbag on a non-grounded side, that is, lateral impact receiving side, is especially not necessary.

SUMMARY OF THE INVENTION

In view of the foregoing and other problems, it is an object of the present invention to provide an occupant restraint system, an unnecessary activation of which can be reduced.

According to a first example of the present invention, an occupant restraint system includes an occupant restraint device on a side face of an automobile interior, at least one of an acceleration sensor for detecting a lateral acceleration of the automobile and a roll sensor for detecting a roll of the automobile, and a determining unit. A detected signal is input into the determining unit. The determining unit determines a rollover or an overthrow of the automobile based on the detected signal, and calculates a head position of the occupant using the detected signal. Then, the determining unit activates the occupant restraint device, when the rollover is determined to have happened and the calculated head position is determined to be close to the occupant restraint device.

According to a second example of the present invention, when an automobile is in a lateral collision, a method of restraining an occupant in the automobile includes a detecting step, a calculating step and an activating step. In the detecting step, a lateral acceleration and a roll of the automobile are detected. In the calculating step, a head position of the occupant is calculated by using the detected signals so as to obtain a distance between the head position and an occupant restraint device. In the activating step, the occupant restraint device is activated only when the distance is equal to or less than a predetermined value such that an unnecessary activation of the device is inhibited.

Accordingly, an unnecessary activation of an occupant restraint system can be reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
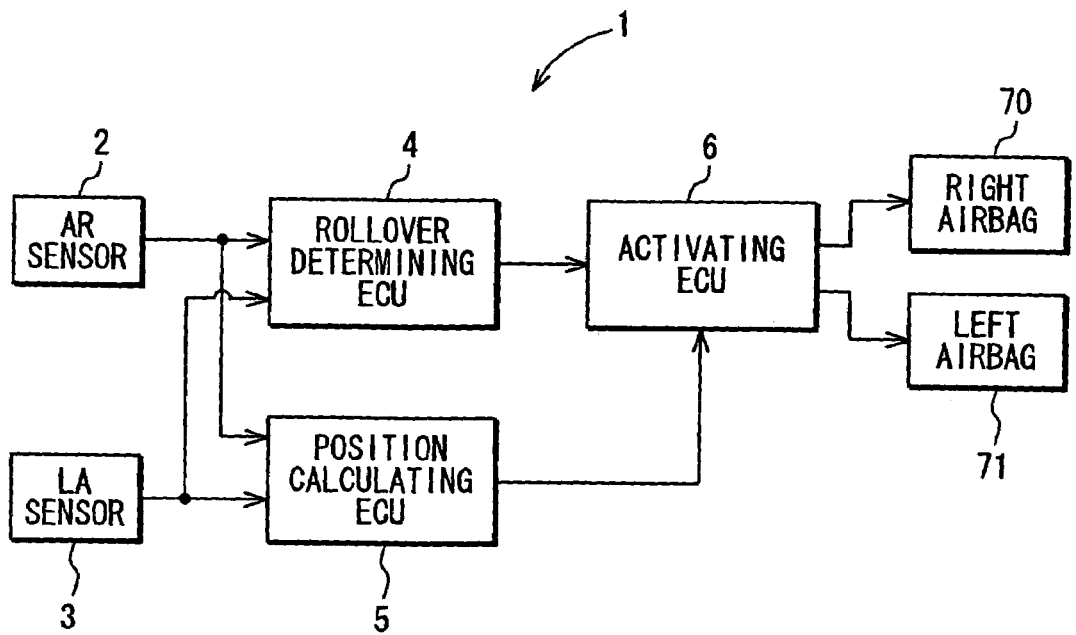
FIG. 1 is a block diagram showing a structure of an occupant restraint system according to a first embodiment.

As shown in FIG. 1, an occupant restraint system 1 in a first embodiment includes an angular rate (AR) sensor 2, a lateral acceleration (LA) sensor 3, a rollover determining electronic control unit (ECU) 4, an occupant position calculating ECU 5, an airbag activating ECU 6, a right curtain airbag 70 and a left curtain airbag 71. The AR sensor 2 operates as a roll sensor. The ECUS 4, 5 and 6 operate as a determining device. The curtain airbags 70 and 71 operate as an occupant restraint device.

In the system 1, each of the sensors 2 and 3 is connected to each of the determining ECU 4 and the calculating ECU 5. A signal detected by each of the sensors 2 and 3 is input into each of the ECUS 4 and 5, and calculations are performed in the ECUS 4 and 5. The calculated results are transmitted to the activating ECU 6, and the ECU 6 controls each of the airbags 70 and 71.

Specifically, when an automobile equipped with the system 1 rolls over, signals detected by the sensors 2 and 3 are transmitted to the rollover determining ECU 4. The ECU 4 determines a rollover of the automobile based on the input signals. Further, the signals detected by the sensors 2 and 3 are also transmitted to the calculating ECU 5. The ECU 5 calculates a head position of the occupant in the automobile interior using the input signals. The ECUs 4, 5 and 6 may be integrated into a single control unit, which performs respective operations as shown in FIG. 2.

Figure 2:
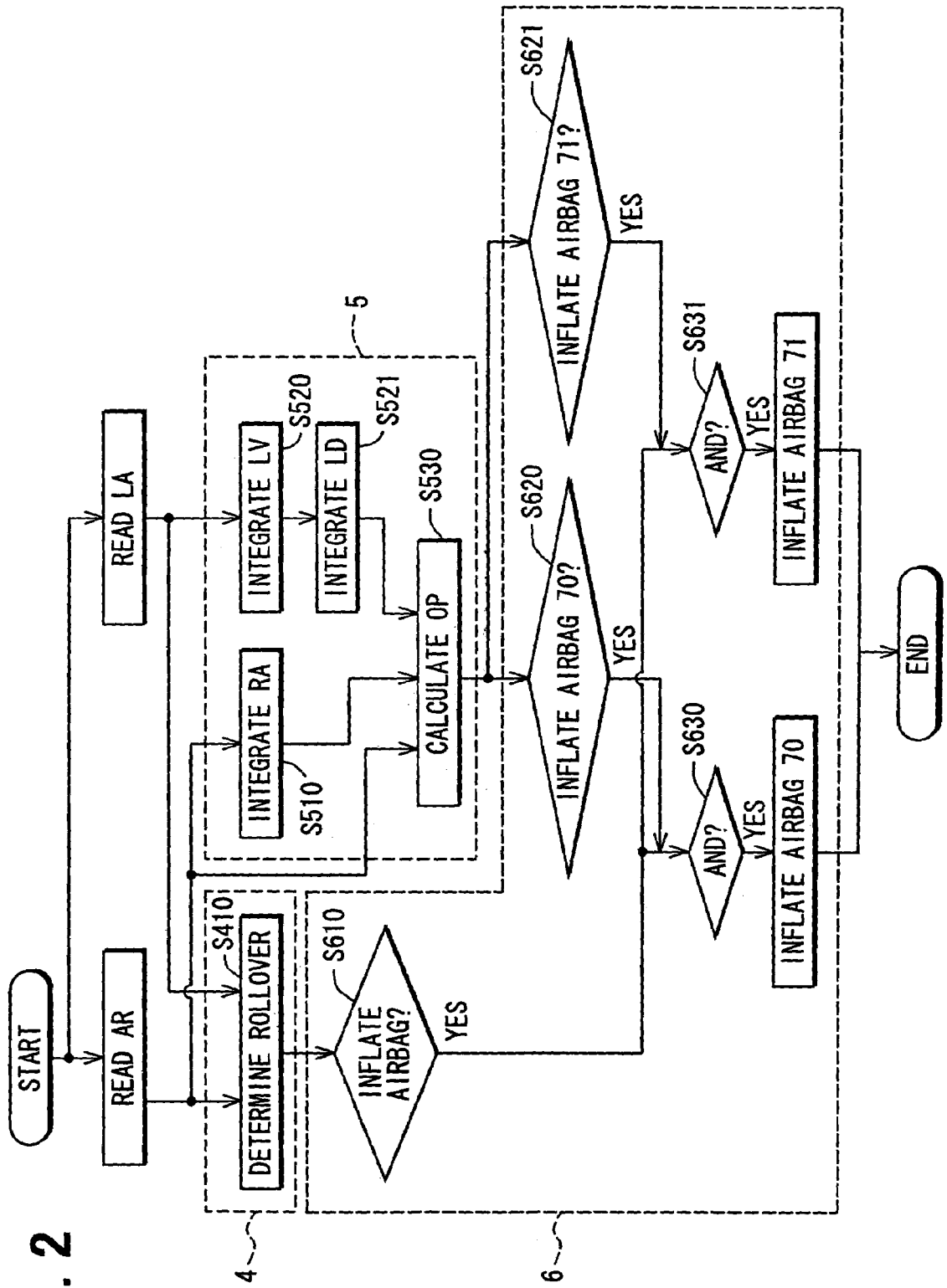
FIG. 2 is a flow chart showing an operation of the occupant restraint system according to the first embodiment.

As shown in FIG. 2, in the ECU 5, a signal, i.e., angular rate AR, detected by the AR sensor 2 is integrated so as to obtain a roll angle RA at S510. Then, an occupant head position OP is calculated using the roll angle RA at S530. Further, a signal, i.e., lateral acceleration LA, detected by the LA sensor 3 is integrated so as to obtain a lateral velocity LV at S520. The lateral velocity LV represents a speed of the automobile in a width direction. Then, the lateral velocity LV is integrated so as to obtain a lateral displacement dimension LD at S521. Thus, the occupant head position OP can also be calculated using the lateral displacement dimension LD at S530.

A rollover determination by the ECU 4 at S410 and the occupant head position OP calculated at S530 in the ECU 5 are transmitted to the activating ECU 6. When the ECU 4 determines that the automobile rolls over, the ECU 6 controls to inflate one of the airbags 70 and 71. The airbag, which is to be inflated, corresponds to the calculated result, i.e., head position, in the ECU 5. That is, when the airbag 70 is close to the head position, the airbag 70 is determined to be inflated at S620. Then, if the airbag 70 is determined to be inflated at both of the S610 and S630, the airbag 70 is inflated. In contrast, when the airbag 71 is close to the head position, the airbag 71 is determined to be inflated at S621. Then, if the airbag 71 is determined to be inflated at both of the S610 and S631, the airbag 71 is inflated. Thus, the airbag corresponding to the calculated result is inflated such that the head of the occupant is protected. The ECU 6 does not control to inflate the other airbag based on the result calculated in the ECU 5, because the head of the occupant is not close to the other airbag.

Moreover, in the system 1, when the head of the occupant is close to one of the airbags 70, 71 and when the result calculated by the ECU 5 indicates that if the airbag is inflated, the head and the inflated airbag will interfere and collide, the activating ECU 6 does not control to inflate the airbag. Thus, a collision between the head and the airbag can be restricted.

Accordingly, an unnecessary activation of an airbag is not performed in the system 1 such that an increase in a repairing cost due to the activation of the unnecessary airbag can be reduced.

Second Embodiment

Figure 3:
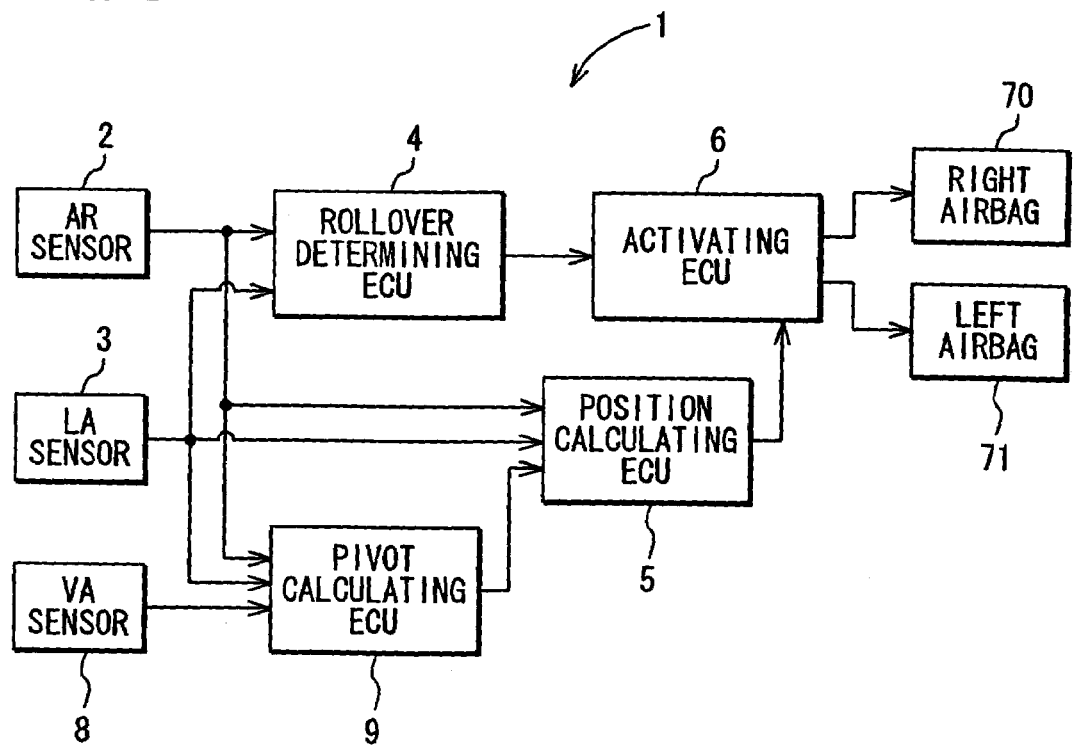
FIG. 3 is a block diagram showing a structure of an occupant restraint system according to a second embodiment.

As shown in FIG. 3, a system 1 in a second embodiment further includes a vertical, i.e., up-and-down direction, acceleration (VA) sensor 8 and a pivot point calculating ECU 9. The VA sensor 8 detects a vertical acceleration of an automobile. The ECU 9 calculates a pivot point for a rollover of an automobile by using signals detected by the sensors 2, 3 and 8. The calculation is performed as follows.

Figure 4:
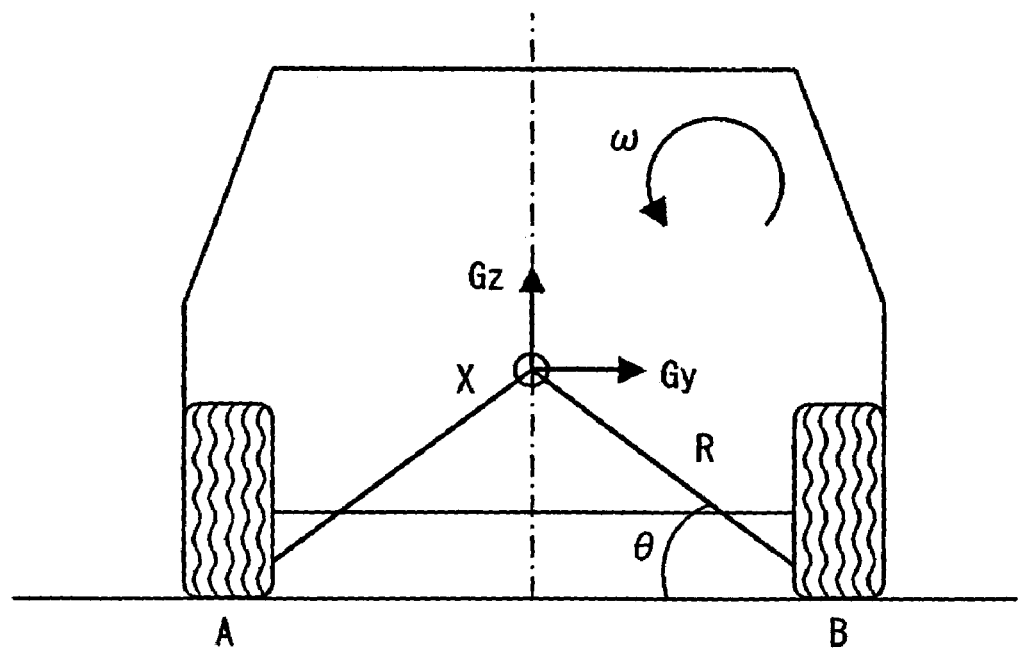
FIG. 4 is a diagram showing a method of calculating a pivot point for a rollover of an automobile.

As shown in FIG. 4, an angular rate $\omega$ is generated by a rollover of an automobile, and a linear motion velocity Vr is generated at a measuring point X by the angular rate $\omega$. The linear motion velocity Vr can be expressed as Formula 1.

$$Vr = R^*\omega \quad \text{Formula 1}$$

In Formula 1, R represents a distance between the measuring point X and a pivot point (A or B) of the rollover. When the velocity Vr is resolved into a vertical, i.e., up-and-down, direction and a horizontal, i.e., automobile width, direction, a vertical velocity Vrz and a horizontal velocity Vry can be expressed as Formulas 2 and 3.

$$Vrz = R^*\omega^*\cos\theta \quad \text{Formula 2}$$

$$Vry = R^*\omega^*\sin\theta \quad \text{Formula 3}$$

In Formulas 2 and 3, $\theta$ represents an angle between a horizontal line and a line connecting the measuring point X and the pivot point (A or B).

When an effect of a gravity G by an incline $\phi$ of the automobile is excluded from an acceleration at the measuring point X measured by an acceleration sensor, a vertical acceleration Gz1 and a horizontal acceleration Gy1 can be expressed as Formulas 4 and 5.

$$Gz1 = Gz - g^*(1-\cos\phi) \quad \text{Formula 4}$$

$$Gy1 = Gy - g^*(\sin\phi) \quad \text{Formula 5}$$

Then, when the acceleration Gz1 and the acceleration Gy1 are integrated, a vertical velocity VGz1 and a horizontal velocity VGy1 can be obtained. When the velocities Vrz and Vry are compared with the velocities VGz1 and VGy1, whether the automobile is inclined about a point A or a point B can be specified. That is, the rollover direction of the automobile can be specified. Based on this rollover direction, whether the head of the occupant is close to the right side or the left side of the automobile interior can be specified. Moreover, a distance between each side of the automobile interior and the head position can be calculated.

Specifically, as shown in FIG. 3, when an automobile equipped with the system 1 rolls over, signals detected by the sensors 2 and 3 are transmitted to the determining ECU 4. The ECU 4 determines a rollover of the automobile based on the signals. Further, signals detected by the sensors 2, 3 and 8 are transmitted to the pivot point calculating ECU 9. The ECU 9 calculates a pivot point for the rollover of the automobile using the signals. The pivot point is a point A or B in FIG. 4. Further, signals detected by the sensors 2 and 3, and the result calculated in the ECU 9 are transmitted to the occupant position calculating ECU 5. The ECU 5 calculates a head position of the occupant in the automobile interior using the signals and the calculated result.

Figure 5:
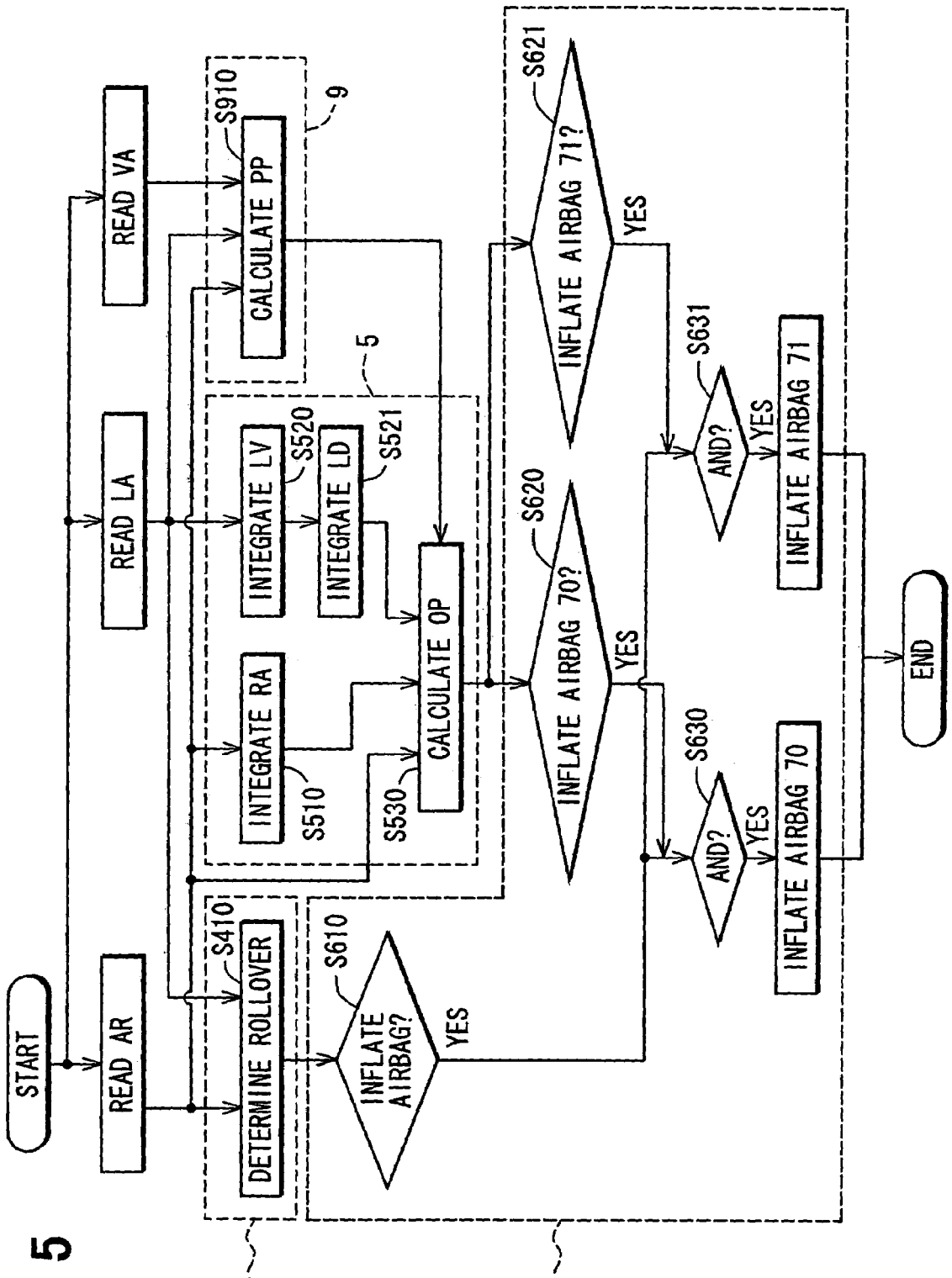
FIG. 5 is a flow chart showing an operation of the occupant restraint system according to the second embodiment.

As shown in FIG. 5, in the ECU 5, a signal, i.e., angular rate RA, detected by the AR sensor 2 is integrated so as to obtain a roll angle RA at S510, and an occupant head position OP is calculated using the roll angle RA at S530. Further, a signal, i.e., lateral acceleration LA, detected by the LA sensor 3 is integrated so as to obtain a lateral velocity LV at S520. The lateral velocity LV represents a speed of the automobile in a width direction. Then, the lateral velocity LV is integrated so as to obtain a lateral displacement dimension LD at S521. Thus, the occupant head position OP can also be calculated using the lateral displacement dimension LD at S 530.

A rollover determination by the ECU 4 at S410, the head position calculated at S530 in the ECU 5, and a rollover state of the automobile calculated at S910 in the pivot point PP calculating ECU 9 are transmitted to the activating ECU 6. When the ECU 4 determines that the automobile rolls over, the ECU 6 controls to inflate one of the airbags 70 and 71. The airbag, which is to be inflated, corresponds to the calculated result, i.e., head position, in the ECU 5. At this time, the head position of the occupant can be calculated by referring to the rollover state calculated in the ECU 9. That is, when the airbag 70 is close to the head position, the airbag 70 is determined to be inflated at S620. Then, if the airbag 70 is determined to be inflated at both of the S610 and S630, the airbag 70 is inflated. In contrast, when the airbag 71 is close to the head position, the airbag 71 is determined to be inflated at S621. Then, if the airbag 71 is determined to be inflated at both of the S610 and S631, the airbag 71 is inflated. Thus, the airbag corresponding to the calculated result is inflated such that the head of the occupant is protected. The ECU 6 does not control to inflate the other airbag based on the result calculated in the ECU 5, because the head of the occupant is not close to the other airbag.

Moreover, in the system 1, when the head of the occupant is close to one of the airbags 70, 71 and when the result calculated by the ECU 5 indicates that if the airbag is inflated, the head and the inflated airbag will interfere and collide, the activating ECU 6 does not control to inflate the airbag. Thus, a collision between the head and the airbag can be restricted.

Accordingly, in the system 1 of the second embodiment, an unnecessary activation of an airbag is not performed such that an increase in a repairing cost due to the activation of the unnecessary airbag can be reduced.

Modified Embodiments

The system 1 in the above embodiments may further include a seatbelt buckle switch, an occupant presence detecting device, a window open/close detecting device, an occupant head position detecting device and an occupant body size detecting device. When these devices are provided in an automobile, signals detected by these devices are transmitted to the ECUS 5 and 6 so as to be referred to for a calculation of an occupant head position and a determination of a controlling of the airbags 70 and 71. Further, a signal of a load applied to a suspension of the automobile may be further input into the ECUS 5 and 6 so as to be referred to for a calculation of an occupant head position and a determination of a controlling of the airbags 70 and 71. By inputting the signals into the ECUS 5 and 6, an accuracy of the controlling of the airbags 70 and 71 can be improved, and a determination error can be reduced. For example, a head position before the rollover can be obtained by the occupant head position detecting device. Even if the occupant is not seated on a correct position before the rollover, the head position of the occupant after the rollover can be accurately calculated. Furthermore, a displacement dimension of the head position is different in accordance with a height of the occupant. The head position of the occupant after the rollover can be accurately calculated by referring to the occupant body side.

Further, the system 1 in the above-described embodiments may not include both of the AR sensor 2 and the LA sensor 3.

Such changes and modifications are to be understood as being within the scope of the present invention as defined by the appended claims.

What is claimed is:

1. An occupant restraint system for an automobile, the system comprising:
    an occupant restraint device on a side face of an automobile interior of the automobile;
    at least one of an acceleration sensor for detecting a lateral acceleration of the automobile and a roll sensor for detecting an angular rate of roll of the automobile; and
    a determining device, into which a detected signal is input from the at least one sensor, wherein
    the determining device determines a rollover or an overthrow of the automobile based on the detected signal,
    the determining device calculates a head position of an occupant in the automobile interior using the detected signal, and
    the determining device activates the occupant restraint device, when the rollover or the overthrow is determined to have happened and the calculated head position of the occupant is determined to be close to the occupant restraint device.

2. The occupant restraint system according to claim 1, wherein:
    the determining device activates the occupant restraint device, when a distance between the head position and the occupant restraint device is equal to or more than a predetermined value.

3. The occupant restraint system according to claim 1, wherein:
    the lateral acceleration detected by the acceleration sensor is double-integrated so as to obtain a lateral displacement dimension;
    the angular rate of roll detected by the roll sensor is integrated so as to obtain an angular displacement; and
    at least one of the lateral displacement dimension and the angular displacement is input into the determining device as the detected signal.

4. The occupant restraint system according to claim 1, wherein:
    at least one of an acceleration signal of the automobile in an up-and-down direction, an acceleration signal of the automobile in a width direction and a signal of a load applied to a suspension of the automobile is further input into the determining device; and
    the determining device determines the rollover or the overthrow by referring to the further input signal.

5. The occupant restraint system according to claim 1, wherein:
    at least one of a seatbelt buckle switch signal, an occupant presence signal and a signal of an open window is further input into the determining device; and
    the determining device activates the occupant restraint device by referring to the further input signal.

6. The occupant restraint system according to claim 1, further comprising:
    an occupant head position detecting device for detecting a head position of the occupant in the automobile interior; wherein
    the determining device calculates a displacement dimension of the head position detected by the occupant head position detecting device.

7. The occupant restraint system according to claim 1, further comprising:
    an occupant body size detecting device for detecting an occupant body size in the automobile interior; wherein
    the determining device calculates a displacement dimension of the head position based on the occupant body size.

8. The occupant restraint system according to claim 1, wherein:
    the occupant restraint device is a curtain airbag.

9. A method of restraining an occupant by an occupant restraint device when an automobile is in a lateral collision, the method comprising:
    detecting a lateral acceleration and an angular rate of roll of the automobile;
    calculating a head position of the occupant by using detection signals indicative of the detected acceleration and the detected angular rate of roll so as to obtain a distance between the head position and the restraint device; and
    activating the occupant restraint device only when the distance is equal to or less than a predetermined value such that an unnecessary activation of the device is inhibited.

10. The method according to claim 9, wherein:
    the detecting further detects an acceleration signal of the automobile in an up-and-down direction; and
    the calculating further calculates a pivot point for a rollover of the automobile by using the detection signals.

11. The method according to claim 10, wherein:
    the calculating calculates the head position by referring to the pivot point.

12. The method according to claim 9, further comprising:
    integrating the angular rate of roll to obtain an angular displacement; and
    double-integrating the detected lateral acceleration to obtain a lateral displacement dimension; wherein
    the calculating step uses the angular displacement and the lateral displacement to obtain the distance.

* * * * *

UNITED STATES PATENT AND TRADEMARK OFFICE
CERTIFICATE OF CORRECTION

PATENT NO.      : 7,635,146 B2                                          Page 1 of 1
APPLICATION NO. : 11/591416
DATED           : December 22, 2009
INVENTOR(S)     : Yoshihisa Ogata It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 482 days.

Signed and Sealed this

Ninth Day of November, 2010

David J. Kappos
*Director of the United States Patent and Trademark Office*